United States Patent [19]

Ise et al.

[11] Patent Number: 4,879,600
[45] Date of Patent: Nov. 7, 1989

[54] IMAGE SENSING APPARATUS WITH CONTROL FOR VARYING THE READOUT METHODOLOGY

[75] Inventors: Makoto Ise, Tokyo; Tadashi Okino, Kanagawa, both of Japan

[73] Assignee: Canon Kabushiki Kaisha, Tokyo, Japan

[21] Appl. No.: 170,767

[22] Filed: Mar. 21, 1988

[30] Foreign Application Priority Data

Mar. 27, 1987 [JP] Japan ................................ 62-071596
Mar. 27, 1987 [JP] Japan ................................ 62-071598
May 18, 1987 [JP] Japan ................................ 62-118863

[51] Int. Cl.$^4$ ............................................. H04N 5/238
[52] U.S. Cl. ................................. 358/213.19; 358/228
[58] Field of Search .............. 358/228, 213.13, 213.19, 358/909, 225, 224

[56] References Cited

U.S. PATENT DOCUMENTS

| 4,335,405 | 6/1982 | Sakane et al. | 358/213.19 |
| 4,593,312 | 6/1986 | Yamasaki | 358/213.19 |
| 4,603,354 | 5/1989 | Hashimoto et al. | 358/909 |
| 4,635,126 | 1/1987 | Kinoshita | 358/228 |
| 4,638,365 | 1/1987 | Kato | 358/228 |

FOREIGN PATENT DOCUMENTS

60-54574  9/1983  Japan .

Primary Examiner—Jin F. Ng
Assistant Examiner—Stephen Brinich
Attorney, Agent, or Firm—Robin, Blecker, Daley & Driscoll

[57] ABSTRACT

In an image sensing apparatus of the kind having an optical system for forming an image of an object, an image sensor arranged to convert information on image bearing light incident on the optical system into an electrical signal and to read out the electrical signal either in a field mode in which two line portions of the signal are added together in reading or in a frame mode in which the line portions of said signal are read out one by one, and a flash device, a control circuit is arranged to control the selection of either the field mode or the frame mode according to a focal length of the optical system or according to a signal indicative of completion of preparation for flashing by the flash device.

25 Claims, 5 Drawing Sheets

IMAGE SENSING APPARATUS WITH CONTROL FOR VARYING THE READOUT METHODOLOGY

BACKGROUND OF THE INVENTION

1. Field of the Invention

This invention relates to an image sensing apparatus and more particularly to an apparatus of the kind having a field/frame image sensing mode selecting function.

2. Description of the Related Art

It is well known that an image sensing apparatus arranged to permit telephoto shooting by means of a zoom lens, an interchangeable lens, or the like, tends to be shaken by vibrations of the hand to give a blurred picture when a long focal length of the lens is selected. This tendency becomes more salient in the event of a relatively long image sensing exposure time.

To prevent the introduction of hand vibrations to the apparatus, the conventional cameras of the kind using a silver halide film or the like have been arranged to shorten the length of exposure time with the shutter speed increased by using a high sensitivity film.

However, in the case of an electronic image sensing apparatus which uses a solid-state image sensor made of a CCD (charge-coupled device) or an MOS (metal-oxide semiconductor) or the like, a camera tube or the like, the sensitivity of the image sensor or the camera tube is not high enough to permit a sufficiently high shutter speed. In addition to that, the apparatus of this kind tends to have an under exposure because of its low degree of sensitivity not only in the case of telephoto shooting but also in the event of, for example, a low luminance object existing indoors. Therefore, the image sensing apparatus of this kind has necessitated some arrangement either to have recourse to the flash photography in the same manner as in the case of the film camera or to make up for the insufficiency of exposure by raising the gain of a video signal during a signal processing operation after image sensing at the expense of quality in terms of the S/N ratio of the signal.

Despite of the arrangement to have recourse to a flash device, however, the conventional electronic image sensing apparatus has often had an under-exposure. Besides, in case of telephoto shooting or the like where the effect of the flash photography is not adequately attainable, there has been provided no appropriate means for making up for the deficiency of exposure.

SUMMARY OF THE INVENTION

It is a general object of this invention to provide an image sensing apparatus which is capable of solving the above stated problem of the prior art and is arranged to minimize the deficiency of exposure in taking the picture of a low luminance object.

It is a more specific object of the invention to provide an image sensing apparatus which is arranged not only to be capable of selecting either a field or frame image sensing mode, on the background of the prior art using the above stated solid-state image sensor or a camera tube, but also to minimize the deficiency of exposure for objects having a wide range of luminance values without giving a blurred picture due to hand vibrations.

The term "field or frame image sensing mode" as used for the purpose of this invention is as follows: In the field image sensing mode, a field signal is formed by adding together and reading electric charges from two lines. In the frame image sensing mode, an amount of signal for two fields (one frame) is formed by discretely reading an electric charge of each line.

To attain the above stated object, an embodiment of the invention is arranged to control the field/frame image sensing mode selection n accordance with the focal length of the optical system, a signal indicative of completion of preparation for flashing and/or the luminance of the object. This arrangement reduces the possibility of image deterioration due to hand vibrations because the sensitivity, the shutter speed, etc. can be automatically controlled to optimum states within the functional limit of the apparatus under the shooting conditions obtained.

Further to attain this object, the embodiment of the invention is provided with control means which is arranged to effect a change-over from one image sensitivity value to another value either by selecting the field image sensing mode or the frame image sensing mode or by adjusting the signal gain attainable at signal processing means according to the luminance value of the object measured after flash light control; or by adjusting the signal gain at the signal processing means with the field or frame image sensing mode selected.

With the embodiment thus arranged to effect a change-over from one image sensitivity value to another value by selecting the field image sensing mode or the frame image sensing mode, etc. according to the luminance value of the object measured after the flash light control, the embodiment is capable of adequately making up for a deficiency of exposure in sensing the image of a low luminance object by the flash light control even if the measured luminance value of the object is low.

Further, in cases where the deficiency of exposure is hardly preventable with the sensitivity increased by the change-over of the image sensing mode, the signal gain is adjusted by the signal processing means, so that the exposure can be adequately compensated for the deficiency.

The above and other objects and features of the invention will become apparent from the following detailed description of embodiments thereof taken in conjunction with the accompanying drawings.

DETAILED DESCRIPTION OF THE PREFERRED EMBODIMENTS

Figure 1:
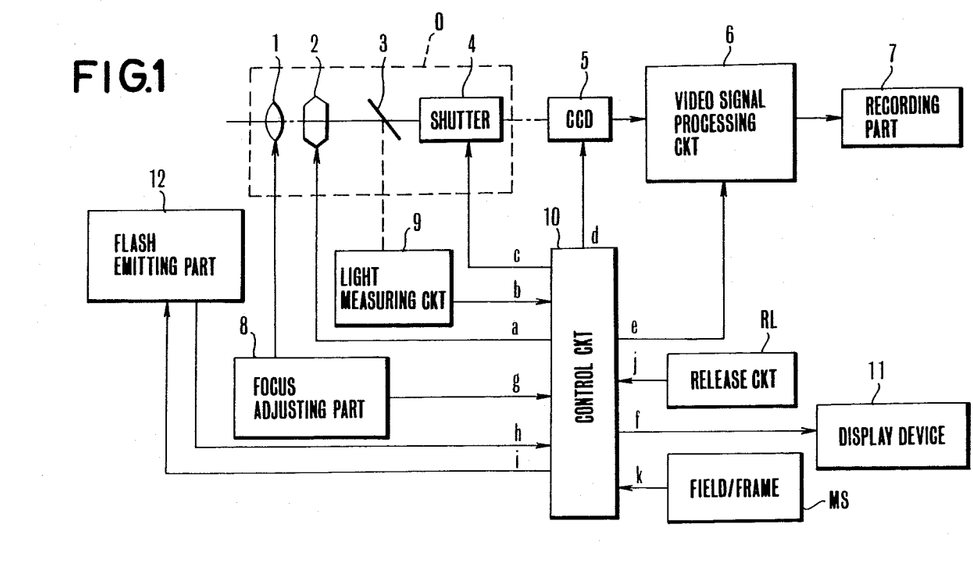
FIG. 1 is a block diagram showing an image sensing apparatus arranged as a first embodiment of this invention.

Embodiments of this invention are described by way of example below with reference to the drawings:

FIG. 1 shows in a block diagram an image sensing apparatus arranged as a first embodiment of the invention. An optical system O is arranged to form the image of an object. The optical system O includes an image forming lens 1; a diaphragm 2; a beam splitter 3 which is arranged to divide an incident light coming from the object into two light fluxes for an image sensing system including a CCD image sensor 5 and a light measuring system including a light measuring circuit 9; and a shutter 4. A reference numeral 6 denotes a video signal processing circuit. A recording part 7 is arranged to record video information on a recording medium. A focus adjusting part 8 is provided for the image forming lens 1. In the case of this image sensing apparatus, the lens 1 is assumed to be a zoom lens having only two different focal lengths including a wide angle focal length and a telephoto focal length, and the focus adjusting part 8 is assumed to be arranged in a most simple form, for the sake of simplification of description, to supply a control circuit 10 via a supply line g with a signal which turns off when the lens 1 is in the wide angle position and turns on when the lens 1 is in the telephoto position. However, in case that the zoom lens 1 is of the kind having its magnification arranged to be continuously variable accordingly as the focal length thereof varies, the control circuit 10 is arranged to receive via the line g information as to whether the focal length is on the wide angle side or on the telephoto side.

The control circuit 10 is arranged to receive information on the luminance of the object from the light measuring circuit 9 via a line b and to compute decisive factors of photo taking time such as a shutter speed value TV and an aperture value AV on the basis of the object luminance information. Further, the control circuit 10 is arranged to control the diaphragm 2 and the shutter 4 through lines a and c and to effect a change-over between the field/frame image sensing modes and a change-over from one value to another of the gain of the video signal system through lines d, e and f.

The recording part 7 is arranged to record the result of a signal processing operation on a solid state memory such as a semiconductor memory or a recording medium using an optical or magnetic element or the like, and to have the results of exposure control, etc. displayed by a display device 11.

It should be noted that the control circuit 10 also controls the various timings for an operation of the image sensing apparatus and detects on- and off-states of a release switch and the other switches.

A flash emitting part 12 is arranged to supply, via a line h, the control circuit 10 with a control signal which is indicative of completion or incompletion of an electric charging process thus indicating, for example, completion of preparation for flashing. The flash emitting part 12 is further arranged to receive, via a line i, a flashing control signal from the control circuit 10. A release circuit RL is arranged to generate a release signal j in response to an operation performed on a manual switch. A mode selection circuit MS is arranged to produce a selection signal for selection between the field image sensing mode and the frame image sensing mode.

Figure 2:
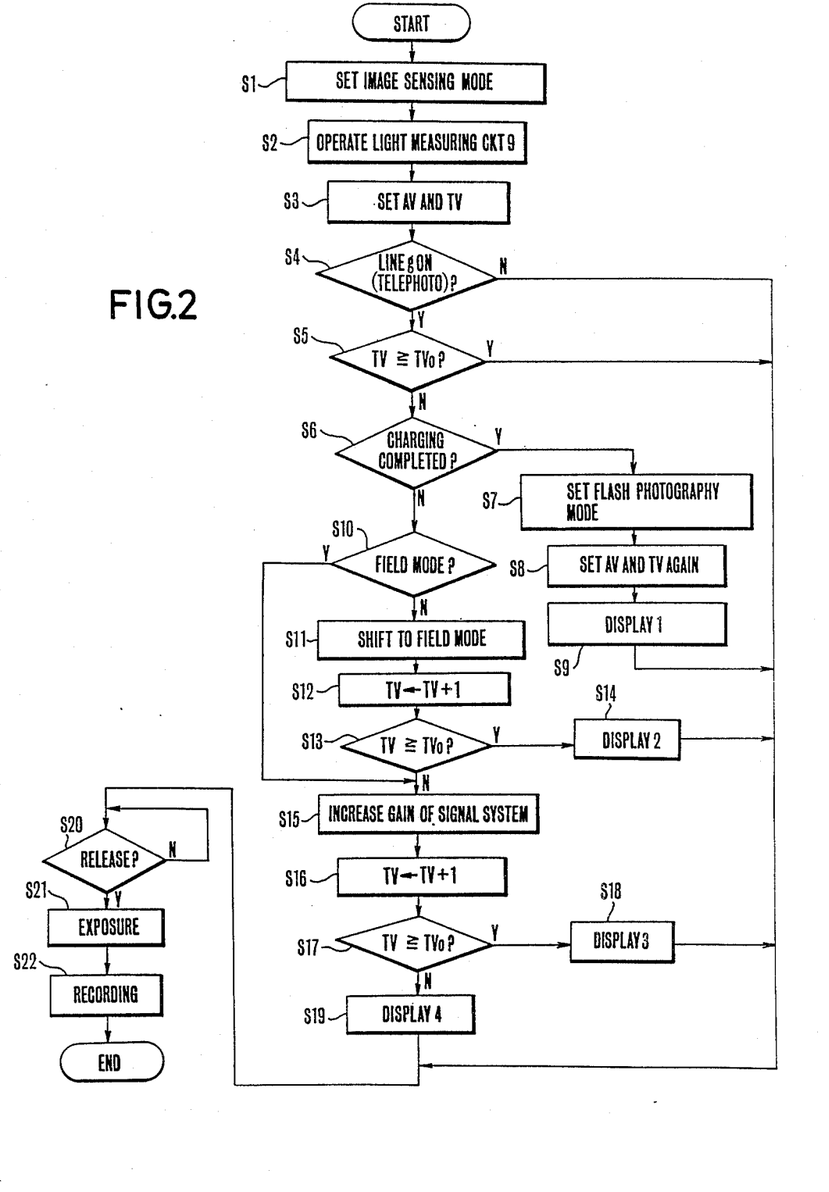
FIG. 2 is a flow chart showing a sequence of operation of the same embodiment.

The operation of the embodiment arranged as described above is as described below with reference to FIG. 2 which is an operation sequence flow chart:

At a step S1: After the power supply to the image sensing apparatus is switched on, the position of an external selection switch which is provided for setting the field or frame image sensing mode is detected through the mode selection circuit MS. Then, the control circuit 10 sets the image sensing mode of the CCD image sensor 5 via the line d either in the field mode or frame mode according to the result of the detection.

Figure 3:
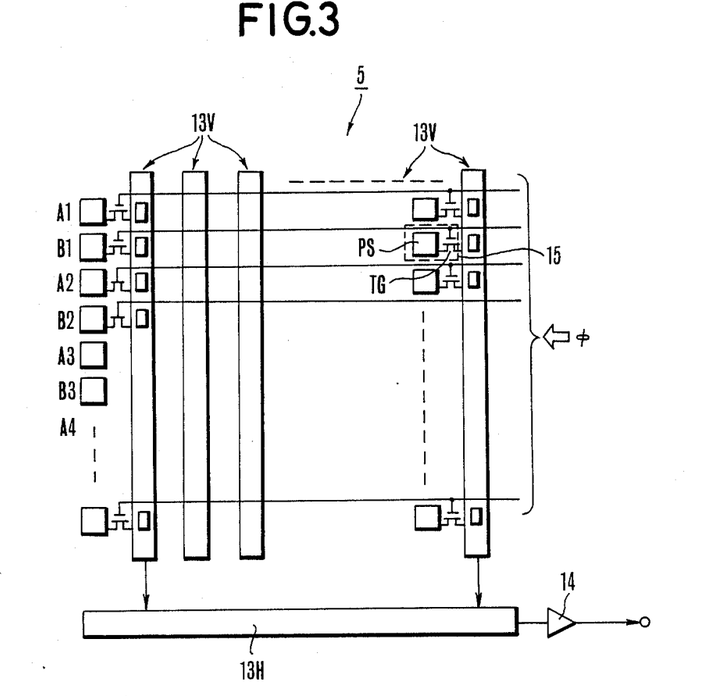
FIG. 3 shows by way of example the basic arrangement of a CCD image sensor.

Before the description of the operation of the whole apparatus, the operations of the CCD image sensor 5 in each of the field and frame modes are briefly described as follows: FIG. 3 shows by way of example the basic arrangement of the CCD image sensor 5 which is usable for this embodiment. Referring to FIG. 3, there are provided a group of vertical shift registers 13V; a horizontal shift register 13H; and a group of sensor parts 15. The unit cell of each of the sensor parts 15 consists of a photo-electric converting part PS which is composed of a photo diode and a transfer gate TG, as shown within a broken line block. A video signal electric charge accumulated at each of the sensor parts 15 is selectively taken in by the applicable vertical shift register 13V in accordance with a pulse $\phi$ which is applied from outside to the transfer gate TG. After that, the electric charge is taken in by the horizontal shift register 13H within a horizontal retrace line period. Then the electric charge is serially produced to the outside from a buffer amplifier 14 via the horizontal shift register 13H during a horizontal scanning period.

The field and frame image sensing modes differ from each other in the transfer process of signal electric charge as follows:

(i) In the frame image sensing mode: During a reading period for a predetermined first field, the electric charges of the photo-electric converting parts aligned in odd number lines as indicated by symbols A1, A2, A3,—in FIG. 3 are first selected by the transfer gates TG and are transferred to the respective vertical shift registers 13V. Following that, during every horizontal retrace line period, the signal electric charges are serially transferred to the horizontal shift register 13H, so that the signal electric charges can be read out during every horizontal scanning period During a reading period for a second field, data (or signal electric charges) of even number lines as indicated by symbols B1, B2, B3,—are taken out into the respective vertical shift registers 13V and are thus serially read out line by line during every horizontal scanning period.

(ii) In the field image sensing mode: The signal electric charges of all the lines are first taken in the respective vertical shift registers 13V. During the first field period, the signal electric charges of adjacent pairs of lines A1 and B1, A2 and B2, A3 and B3,—are added together within the respective vertical shift registers 13V and are serially transferred to the horizontal shift register 13H during every horizontal retrace line period. During the second field period, the selecting, adding two-line combination is changed in such a way as B1+A2, B2+A3,—. Then, the signal electric charge is read out in the same manner as during the first field period.

Therefore, because of the difference in the transfer process, the amount of electric charge transfer for each picture element signal obtained in the field image sensing mode in the output of the amplifier 14 becomes twice as much as the amount obtained in the frame image sensing mode. As a result, the sensitivity obtained in the field image sensing mode is two times as high as the sensitivity obtained in the frame image sensing mode.

Again referring to the flow chart of FIG. 2, the description of operation of the embodiment continues as follows: At a step S2: the light measuring circuit 9 (see FIG. 1) comes to operate. Then, information on the luminance of the object is supplied via the line b to the control circuit 10. At a step S3: In accordance with a given programed diagram, the control circuit 10 computes the optimum aperture and shutter speed values AV and TV. At a step S4: In accordance with information on the focal length of the image forming lens 1 obtained via the line g, the control circuit 10 makes a discrimination between a wide angle side position and a telephoto side position of the lens 1. If the lens position is on the wide angle side (the line g is in an off-state), the operation jumps to a step S20 to wait for a release signal j. In this instance, the field/frame image sensing mode selection circuit MS remains in the state set at the step S1 while the sensitivity is also not corrected by an increase of the gain of the video signal system. Therefore, there takes place no deterioration in image information.

If the lens 1 is found to be on the telephoto side at the step S4 (the line g is in an on-state), the flow of operation proceeds to a step S5. Step S5: A check is made to see if the shutter speed value TV is above a hand vibration allowable limit speed value TVo. If so, the flow jumps to the step S20 to wait for the release operation. If not, (TV<TVo), the flow proceeds to a step S6. Step S6: The control circuit 10 checks the flash emitting part 12 via the line h for the electric charge completion state of the flash emitting part 12. If the flash emitting part 12 is found to be in the charge completion state, the flow proceeds to a step S7. Step S7: Information on that the apparatus is in the flash photography mode is stored. At a step S8: The control circuit 10 sets the aperture value AV and the shutter speed value TV at values apposite to the amount of flash light (or a guide number) of the flash emitting part 12. At a step S9: The control circuit 10 then causes the display device 11 via the line f to display that the apparatus has been automatically shifted to the flash photography mode due to a deficiency of exposure light. Then, at the step S20, the flow of operation waits for the release.

Further, if the flash emitting part 12 is found to be not in the completely charged state at the step S6, the flash emitting part 12 is not usable At a step S10: In that event, the CCD image sensing mode which has been set at the step S1 is checked to see if it is in the field mode. If so, the flow comes to a step S15 because it is impossible to increase the sensitivity by change-over of the image sensing mode. Step S15: A process of increasing the signal system gain is performed. Conversely to this, if the CCD image sensing mode is found to be in the frame mode at the step S10, the flow proceeds to a step S11. Step S11: The image sensing mode is shifted to the field mode and the flow comes to the step S15. Then, the sensitivity is substantially increased by two times through the process of the step S15. At the same time, the shutter speed value TV is incremented by one step to increase thereby the shutter speed by one step at a step S12. Then, the flow proceeds to a step S13. Step S13: Again a check is made for the relation of TV≧TVo. If the shutter speed is found to be above the hand vibration allowable limit value TVo, the flow proceeds to a step S14. Step S14: The control circuit 10 causes the display device 11 via the line f to display that the image sensing mode has been automatically shifted to the field mode due to a deficiency of exposure light. The flow then jumps to the step S20 to wait for the release.

In case that the image sensing mode is found to have been set in the field mode at the step S10 or that the shutter speed value TV is found to be lower than the hand vibration limit value TVo at the step S13, the flow comes to the step S15 to increase, via the line e, the gain of the video signal processing circuit 6 by two times. At a step S16: Then, the shutter speed value TV is incremented by one step for increasing the shutter speed by one step. After that, the flow comes to a step S17. Step S17: Again a check is made to see if the relation of TV≧TVo is obtained. If so, the flow proceeds to a step 18. Step S18: The control circuit 10 causes the display device 11, via the line f, to display that the gain of the signal system has been automatically increased due to a deficiency of exposure light. The flow then comes to the step S20 to wait for the release.

If the shutter speed value TV is found to be still lower than the limit value TVo at the step S17 (the result of the check is "No"), the sensitivity cannot be increased by any means. The flow then comes to a step S19. Step S19: The control circuit 10 causes, via the line f, the display device 11 to give a warning against the possibility of a blurred picture due to hand vibration. The flow then comes to the step S20 to wait for the release.

At the step S20: The release circuit RL is checked to see if the release button is pushed. If so, the flow proceeds to a step S21. Step S21: The control circuit 10 causes the diaphragm 2 and the shutter 4 to be driven according to the preset aperture value AV and the preset shutter speed value TV, and also the flash emitting part 12 to flash, in the event of the flash photography mode. The CCD image sensor 5 is thus exposed to light. At a step S22: Information on the image of an object is recorded by the recording part 7 at apposite timing, for example, on a magnetic recording medium. The sequence of operation of the first embodiment which is arranged as shown in FIG. 1 thus comes to an end.

In the foregoing, the embodiment is described only for the case where the sensitivity is arranged to be increased by two times by adjusting the gain of the video signal system. However, this arrangement may be changed to increase the sensitivity by some continuously varying means.

Further, the hand vibration problem is arranged to be prevented with the process of increasing the sensitivity performed by effecting change-over of the image sensing mode prior to the other sensitivity increasing process which is performed by adjusting the gain of the signal processing system. However, the embodiment of course can be changed to perform the latter process prior to the former sensitivity increasing process. As regards the flash photography mode, this mode is arranged to be automatically selected. However, in addition to that automatical selection arrangement, the embodiment may be provided with manual flash mode selecting means.

The image forming lens of the embodiment is selectable from among lenses of varied kinds including a zoom lens to be incorporated in the image sensing part, an interchangeable single-focal-length lens, an interchangeable zoom lens, etc. In the case of the interchangeable lens, the embodiment is provided with a storage part which is arranged at the lens to correspond to the focal length of the lens.

Further, the embodiment described is arranged to use a shutter speed value TV which can be expressed as $1/T = 2^{TV}$ relative to an exposure time T obtainable by the shutter 4 and an aperture value which can be expressed as $F^2 = 2^{AV}$ relative to the F-number This invention is of course not limited to such arrangement.

For detecting the object's luminance, the embodiment is discretely provided with a light measuring circuit 9 including an SPC (silicon photo cell), etc. However, this may be replaced with an arrangement for detecting the object's luminance by smoothing the output of the image sensor CCD 5 and particularly the luminance component thereof. Further, in case that the sequence of operation of FIG. 2 does not include the use of the flash device, the steps S6 to S9 may be omitted.

The image sensing apparatus of the first embodiment described in the foregoing is arranged to have the field mode in which signal electric charges are read out in the two-line adding manner and the frame mode in which the signal electric charges are read out from the lines one by one. The selection of one of the two image sensing modes is controlled either in accordance with the focal length of the optical system or with completion of preparation for flashing. The embodiment is thus arranged to be capable of lessening the frequency of occurrences of deterioration of images due to hand vibrations, etc.

Figure 4:
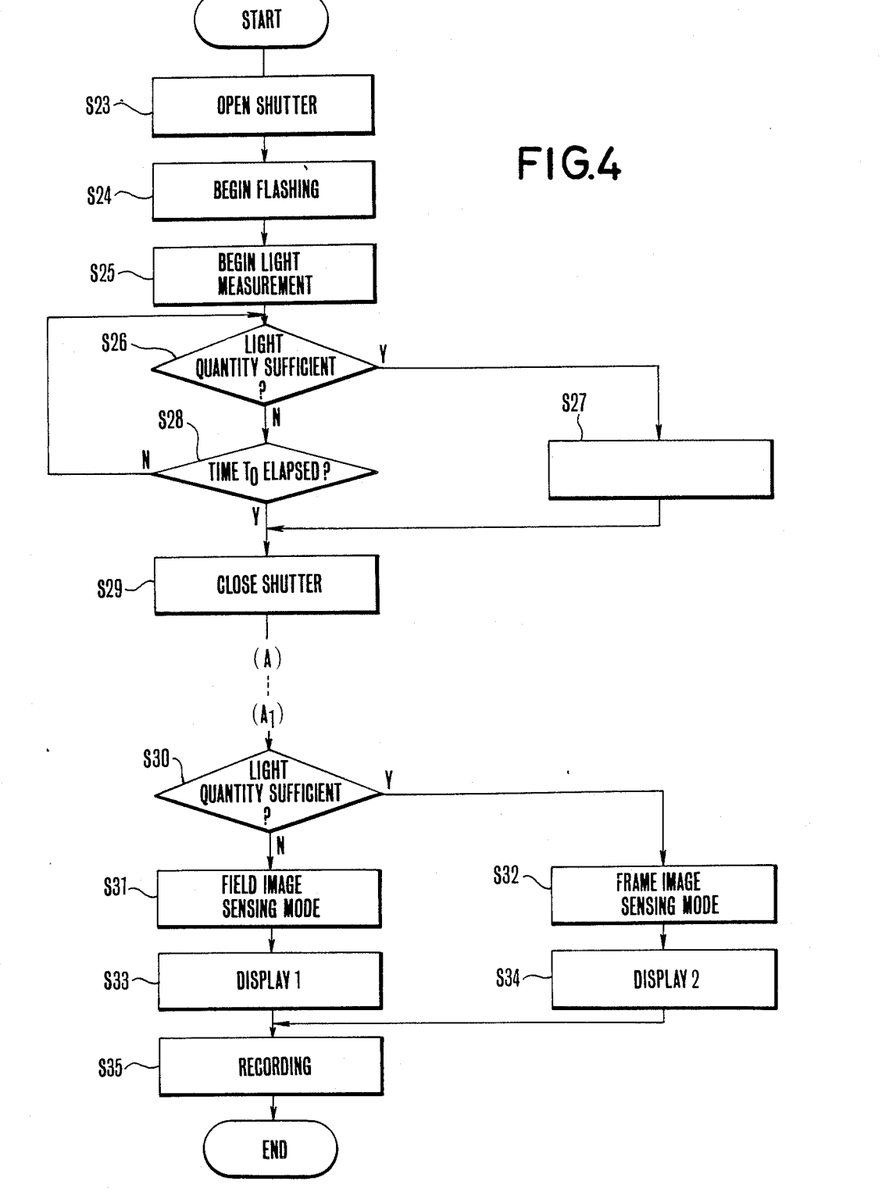
FIGS. 4, 5 and 6 are flow charts respectively showing the operations of control circuits included in second, third and fourth embodiments of the invention.

FIG. 4 shows in a flow chart the operation of a control circuit 10 which is, in this case, arranged as a second embodiment of this invention. Referring to FIG. 4, the whole apparatus is rendered operative when the release signal is produced from the release circuit RL in response to an operation performed on the release button after the power supply is switched on. At a step S23: The control circuit 10 causes the shutter 4 to open via the line c. At a step S24: The control circuit 10 causes, via the line i, the flash emitting part 12 to begin to flash. Step S25: The light measuring circuit 9 begins to measure the luminance of the object. A measured light value (an integrated value of the quantity of light received) is supplied via the line b to the control circuit 10. Step S26: The measured light value L1 supplied to the control circuit 10 is compared with an apposite light quantity value L0. The control circuit 10 thus makes a check to see if the measured light value L1 is sufficient. If so, (L1≧L0), the measured light value L1 obtained at that point of time is retained and the flow of operation proceeds to a step S27. At the step S27: The control circuit 10 turns off the flash emitting part 12 via the line i to have flashing terminated. If the measured light quantity is found to be insufficient (L1<L0) at the step S26, the steps S26 and S28 are repeated within a given period of time T0. The flashing action is brought to a stop at a point of time when either the light quantity becomes sufficient or the period of time T0 expires. The measured light value L1 is retained up to that point of time. The given period of time T0 is normally arranged to be a flash synchronizing exposure time (about 1/60 sec or thereabout). Step S29: Following the step S28, the control circuit 10 causes, via the line c, the shutter 4 to be closed. The flow proceeds to a step S30. Step S30: The control circuit 10 again checks the light quantity to see if it is sufficient on the basis of a reference value L0'. The reference value L0' is set at about 70% of the above stated apposite light quantity value L0. If the light quantity is found to be sufficient (L1≧L0'), the flow of operation comes to a step S32. At the step S32, the control circuit 10 causes, via the line d, the signal electric charge to be read out from the CCD image sensor 5 by automatically selecting the frame image sensing mode. If not, (L1<L0), the flow of operation comes to a step S31. At the step S31, the control circuit 10 automatically selects the frame image sensing mode in which the sensitivity becomes two times as much as the sensitivity obtained in the field image sensing mode. Steps S34 or S33: The display device 11 is caused to display the selection of the frame image sensing mode or the field image sensing mode. Step S35: The video signal read out from the CCD image sensor 5 is recorded, through the video signal processing circuit 6, by the recording part 7 on the recording medium.

Figure 5:
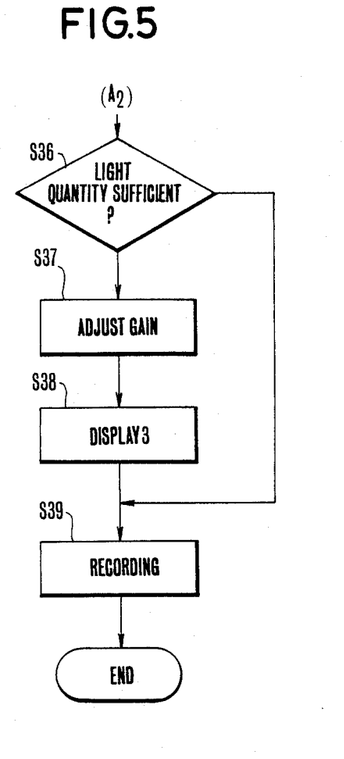

FIG. 5 is a flow chart showing the operation of a third embodiment of the invention. The first half of the sequence of operation of the third embodiment is similar to the first half part (A) of FIG. 4 and is, therefore, omitted from the following description:

Step S36: A check is made in exactly the same manner as at the step S30 of the second embodiment. If the light quantity is found to be sufficient, the video signal coming to the video signal processing circuit 6 is processed at a preset level of gain and the flow comes to a step S39. Step S39: The video signal thus processed is recorded on the recording medium by the recording part 7. If the light quantity is found to be insufficient at the step S36, the flow comes to a step S37. Step S37: The control circuit 10 causes, via the line e, the gain of the video signal passing through the video signal processing circuit 6 to be adjusted to an apposite level. Step S38: Then, the display device 11 is caused to make a display about this gain adjustment. Step S39: The video signal thus processed is recorded on the recording medium by the recording part 7.

Figure 6:
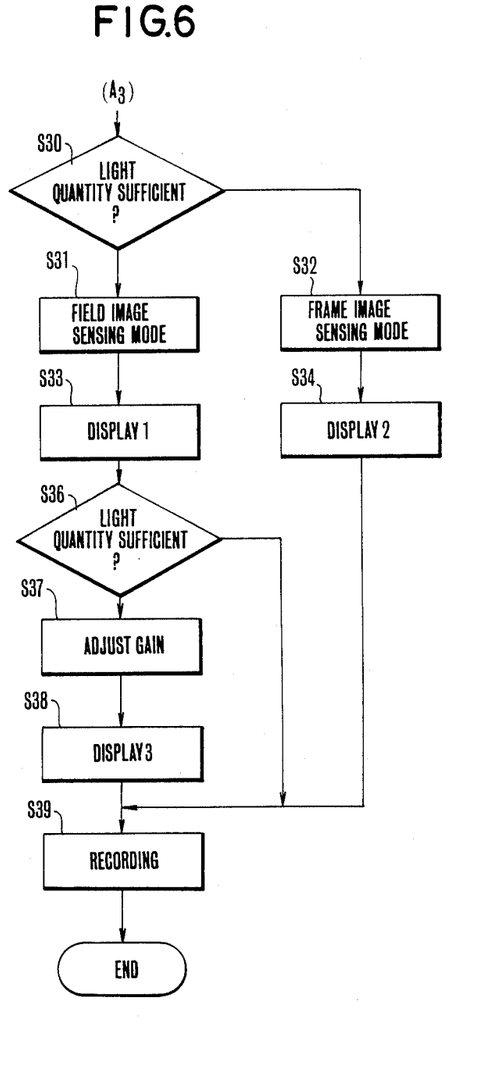

FIG. 6 is a flow chart showing the operation of a fourth embodiment of the invention. The part (A) of the flow of operation is similar to what is shown in FIG. 4 and is, therefore, omitted from the following description, wherein the steps of the same step numbers as those of FIGS. 4 and 5 are identical with those shown in FIGS. 4 and 5. Namely, when the light quantity is found to be sufficient at a step S30 of FIG. 6, the flow of operation comes to a step S32 to select the frame image sensing mode. Then, at a step S34, the display device 11 displays that the frame image sensing mode has been selected. After the display, the flow comes to a step S39. At the step S39, the video signal is processed through the video signal processing circuit 6 with the gain thereof left unchanged from its initial set value and is then recorded on the recording medium by the recording part 7.

In the event of insufficient light quantity, the flow comes to a step S31. At the step S31: The field image sensing mode is selected. Step S33: The display device 11 displays the selection of the field image sensing mode. The flow comes to a step S36. Step S36: The control circuit 10 again makes a check for the light quantity. However, the light quantity is determined this time with the degree of increase of sensitivity which results from the shift to the field image sensing mode taken into consideration. In other words, the measured light value L1 is doubled into a value 2L1 and is compared with the apposite light quantity value L0. If the light quantity is thus found to be sufficient (2L1≧L0), the flow comes to the step S39. Then, the video signal which is processed by the video signal processing circuit 6 with the gain thereof left unchanged from the initial set value is recorded on the recording medium by the recording part 7.

If the light quantity is found to be insufficient (2L1<L0) at the step S36, the flow comes to a step S37 to have the gain of the video signal adjusted to an apposite level at the video signal processing circuit 6. At step S38: This is displayed by the display device 11. The video signal thus processed is recorded on the recording medium by the recording part 7 at the step S39.

As is apparent from the foregoing description, the second, third and fourth embodiments of the invention are arranged to sense the image of a low luminance object by electrically changing the image pick-up sensitivity from one value over to another and by selecting, for that purpose, either the field image sensing mode or the frame image sensing mode according to the measured value of the object's luminance obtained through flash light control. This arrangement enables these embodiments to compensate for the deficiency of exposure light without impairing the S/N ratio of the signal even in the event of a low measured value of the object's luminance.

What is claimed is:

1. An image sensing apparatus comprising:
   (a) an optical system for forming an image of an object to be photographed;
   (b) image sensing means for photo-electrically converting said formed image into an electrical image signal to be accumulated; and
   (c) control means for changing a method for reading out said electrical image signal from said image sensing means in accordance with information on a focal length of said optical system.

2. An apparatus according to claim 1, further comprising signal forming means for forming a signal relative to the focal length of said optical system.

3. An apparatus according to claim 1, wherein said control means has a first reading mode in which picture element portions of said electrical image signal of the image sensing means are serially read out one by one, and a second reading mode in which a plurality of picture element portions of said electrical image signal are added together and are serially read out.

4. An apparatus according to claim 3, wherein said control means is arranged to select one of said first and second reading modes according to the focal length of said optical system.

5. An apparatus according to claim 1, further comprising detection means for detecting a luminance of said object to produce a detection signal.

6. An apparatus according to claim 5, wherein said control means is arranged to change said reading method on the basis of a combination of said detection signal produced from said detection means and the information on said focal length.

7. An apparatus according to claim 1, further comprising a flash device for illuminating said object.

8. An apparatus according to claim 7, further comprising detection means for detecting a luminance of said object to produce a detection signal.

9. An apparatus according to claim 8, wherein said control means is arranged to change said reading method on the basis of a combination of three factors including said detection signal produced from said detection means, information as to whether said flash device is to be used and the information on said focal length.

10. An apparatus according to claim 1, further comprising variable gain control means for amplifying an output of said image sensing means.

11. An apparatus according to claim 10, wherein said control means is arranged to change a combination of said reading method and a gain of said variable gain control means according to the information on said focal length.

12. An apparatus according to claim 10, further comprising detection means for detecting a luminance of said object to produce a detection signal.

13. An apparatus according to claim 12, wherein said control means is arranged to change a combination of said reading method and a gain of said variable gain control means on the basis of a combination of said detection signal produced from said detection means and the information on said focal length.

14. An apparatus according to claim 12, further comprising a flash device for illuminating said object.

15. An apparatus according to claim 14, wherein said control means is arranged to change a combination of said reading method and a gain of said variable gain control means on the basis of a combination of three factors including said detection signal produced from said detection means, information as to whether said flash device is to be used and the information on said focal length.

16. An image sensing apparatus comprising:
   (a) image sensing means for converting an image of an object into an electrical image signal;
   (b) flash illuminating means for illuminating said object with a flash light;
   (c) detection means for detecting a luminance of said object obtained under illumination by the flash light of said flash illuminating means to produce a detection signal; and
   (d) control means for changing a reading method for reading out said electrical image signal of said image sensing means according to said detection signal produced from said detection means, said control means having a first reading mode in which picture element portions of said electrical image signal of the image sensing means are serially read out one by one, and a second reading mode in which a plurality of picture element portions of said electrical image signal are added together and are serially read out.

17. An apparatus according to claim 16, wherein said control means is arranged to select one of said first reading mode and said second reading mode according to said detection signal of said detection means.

18. An apparatus according to claim 16, further comprising variable gain control means for amplifying an output of said image sensing means.

19. An apparatus according to claim 18, wherein said control means is arranged to change a combination of said reading method and a gain of said variable gain control means in accordance with said detection signal of said detection means.

20. An image sensing apparatus comprising:
   (a) image sensing means for converting an image of an object into an electrical image signal;
   (b) flash illuminating means for illuminating said object with a flash light;
   (c) detection means for detecting whether a sufficient quantity of the flash light is obtainable on flash light illumination by said flash illuminating means to produce a detection signal;
   (d) variable gain amplifying means for amplifying said electrical image signal read out from said image sensing means at a rate of gain set according to said detection signal of said detection means;
   (e) exposure control means for controlling the quantity of light incident on said image sensing means; and
   (f) exposure correction means for correcting to a predetermined degree the degree of exposure obtainable under the control of said exposure control means after the gain attainable by said variable gain amplifying means is changed according to said detection signal.

21. An apparatus according to claim 20, further comprising:
an optical system for forming an image of an object to be photographed.

22. An apparatus according to claim 21, further comprising:
control means for changing method for reading out said electrical image signal from said image sensing means in accordance with information on a focal length of said optical system.

23. An apparatus according to claim 22, further comprising signal forming means for forming a signal relative to the focal length of said optical system.

24. An apparatus according to claim 22, wherein said control means has a first reading mode in which picture element portions of said electrical image signal of the image sensing means are serially read out one by one, and a second reading mode in which a plurality of picture element portions of said electrical image signal are added together and are serially read out.

25. An apparatus according to claim 24, wherein said control means is arranged to select one of said first and second reading modes according to the focal length of said optical system.

* * * * *